(12) United States Patent
Kumar (10) Patent No.: US 7,511,463 B2
(45) Date of Patent: Mar. 31, 2009

(54) MULTIPLE OUTPUT BUCK CONVERTER

(75) Inventor: Pavan Kumar, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 182 days.

(21) Appl. No.: 11/158,576

(22) Filed: Jun. 21, 2005

(65) Prior Publication Data

US 2006/0284490 A1    Dec. 21, 2006

(51) Int. Cl.
*G05F 1/577* (2006.01)

(52) U.S. Cl. ................ 323/267; 323/282; 323/271

(58) Field of Classification Search ........... 323/267, 323/282, 271, 268, 225, 272; 307/82, 12, 307/16, 38–41
See application file for complete search history.

(56) References Cited

U.S. PATENT DOCUMENTS

| | | | | |
|---|---|---|---|---|
| 5,336,985 A | * | 8/1994 | McKenzie | 323/266 |
| 5,886,508 A | * | 3/1999 | Jutras | 323/267 |
| 6,087,817 A | * | 7/2000 | Varga | 323/282 |
| 6,191,964 B1 | * | 2/2001 | Boylan et al. | 363/89 |
| 6,222,352 B1 | * | 4/2001 | Lenk | 323/267 |
| 6,611,435 B2 | | 8/2003 | Kumar et al. | |
| 6,639,391 B2 | | 10/2003 | Huang et al. | |
| 6,674,657 B2 | * | 1/2004 | Nagaya et al. | 363/50 |
| 6,747,855 B2 | | 6/2004 | Kumar et al. | |

* cited by examiner

*Primary Examiner*—Akm E Ullah
*Assistant Examiner*—Harry Behm
(74) *Attorney, Agent, or Firm*—Kevin A. Reif (57) ABSTRACT

In some embodiments, a three-switch dual output buck converter includes a converter circuit having N+1 switch circuits, the converter circuit being configured to receive an input voltage and to provide N output voltages, where N is two or more, and a control circuit to selectively provide control signals to the N+1 switch circuits at time intervals in accordance with the N output voltages. Other embodiments are disclosed and claimed.

23 Claims, 10 Drawing Sheets

MULTIPLE OUTPUT BUCK CONVERTER

The invention relates to buck converters and more particularly to an N+1 switch N output buck converter, where N is two or more.

BACKGROUND AND RELATED ART

Voltage converters are well known in the art. U.S. Pat. Nos. 6,747,855, 6,639,391, and 6,611,435 each describe various electronic systems utilizing voltage regulators.

BRIEF DESCRIPTION OF THE DRAWINGS

Various features of the invention will be apparent from the following description of preferred embodiments as illustrated in the accompanying drawings, in which like reference numerals generally refer to the same parts throughout the drawings. The drawings are not necessarily to scale, the emphasis instead being placed upon illustrating the principles of the invention.

DESCRIPTION

In the following description, for purposes of explanation and not limitation, specific details are set forth such as particular structures, architectures, interfaces, techniques, etc. in order to provide a thorough understanding of the various aspects of the invention. However, it will be apparent to those skilled in the art having the benefit of the present disclosure that the various aspects of the invention may be practiced in other examples that depart from these specific details. In certain instances, descriptions of well known devices, circuits, and methods are omitted so as not to obscure the description of the present invention with unnecessary detail.

Figure 1:
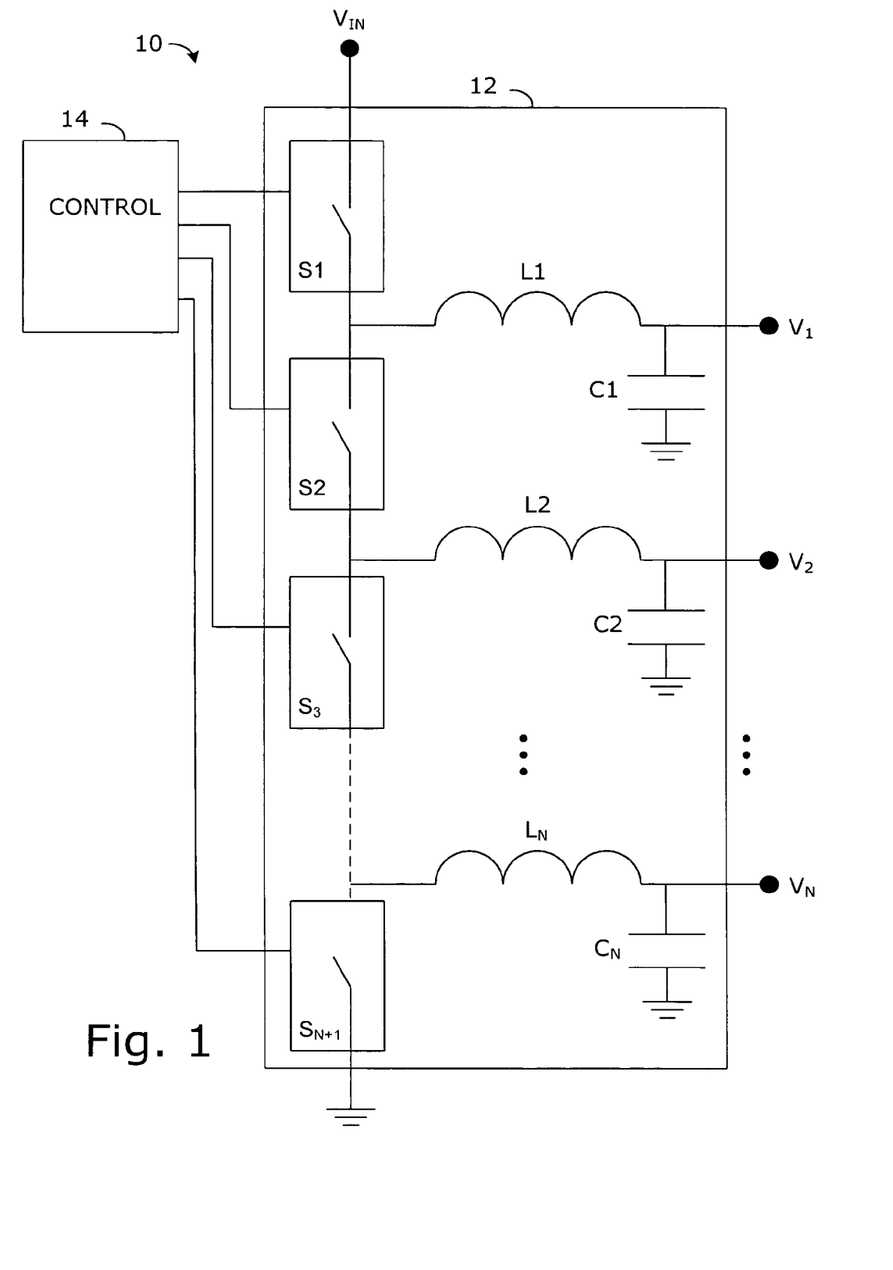
FIG. 1 is a block diagram in accordance with some embodiments of the present invention.

With reference to FIG. 1, a voltage converter 10 may include a converter circuit 12 which may have N+1 switch circuits S1 through $S_{N+1}$. The converter circuit 12 may be configured to receive an input voltage $V_{IN}$ and may provide N output voltages $V_1$ through $V_N$, where N is two or more, and a control circuit 14 to selectively provide control signals to the N+1 switch circuits S1 through $S_{N+1}$ at time intervals in accordance with the N output voltages $V_1$ through $V_N$. In general, each successive output voltage may be equal to or less than the prior output voltage (e.g. $V_1 \geq V_2 \geq \ldots V_N$) For example, two switch circuits (e.g. S1 and S2) may be utilized to produce a first output voltage (e.g. $V_1$) of the N output voltages and only one additional switch circuit (e.g. S3 through $S_{N+1}$) may be provided for each additional output voltage (e.g. $V_2$ through $V_N$) Of the N output voltages. The voltage converter 10 may be considered to have a cascaded buck converter topology that utilizes semiconductor switches in an improved manner such that the number of switches may be reduced.

In some embodiments, the converter circuit 12 may include a first switch circuit S1, a second switch circuit S2, and a third switch circuit S3 coupled in series between the input voltage $V_{IN}$ and the ground potential. The circuit 12 may further include a first LC circuit (e.g. L1 and C1) coupled to a junction of the first and second switch circuits S1, S2 and a second LC circuit (e.g. $L_2$ and $C_2$) coupled to a junction of the second and third switch circuits S2, S3. The first LC circuit may be configured to provide a first output voltage $V_1$ and the second LC circuit may be configured to provide a second output voltage $V_2$, which is different from the first output voltage $V_1$.

For example, the control circuit 14 may be configured to turn on the first and second switch circuits S1, S2 and turn off the third switch circuit S3 during a first interval of a period of a switching cycle. The control circuit 14 may be further configured to turn on the first and third switch circuits S1, S3 and turn off the second switch circuit S2 during a second interval of the same period of the switching cycle. The control circuit 14 may be further configured to turn on the second and third switch circuits S2, S3 and turn off the first switch circuit S1 during a third interval of the same period of the switching cycle. More intervals and switch configurations may be utilized during the switching interval to provide all of the needed output voltages for each cascaded stage.

A conventional buck converter generally uses two or more switching elements (e.g. FETs or MOSFETs) for each output voltage. For example, to provide N output voltages the conventional buck converter may require 2N switching elements. Advantageously, some embodiments of the present invention may use a lower number of switching elements thus reducing space and platform cost. For example, some embodiments of the present invention may provide N output voltages using N+1 switching elements, where N is two or more.

For example, according to some embodiments of the invention a buck topology based dual output converter with a lower number of switching elements can be configured to utilize the freewheeling branch during both parts of a switching cycle. In such a case the switch S2 may carry current in both directions depending on the operating state of the converter. For example, the switch S2 may perform two functions. During one interval of the cycle, S2 transfers energy from the source $V_{IN}$ via S1 to the output $V_2$. During another interval of the same cycle S2 maintains the energy flow through the inductor L1 by providing a path in series with S3.

In general, some embodiments of the invention may utilize N+1 switches to deliver N output voltage rails. However, in some applications the extension of the principle to deliver a high number of output voltages may place a burden on the lower most set of switches in terms of current handling capability and the converter circuit may become inefficient or impractical, particularly for applications where both a high number of voltage rails and high output current are needed. In cases where the number of rails needed is high but the output current requirements are low (e.g. a low voltage, low current scenario), more rails can be built up with negligible or acceptable device stresses. Such requirements are generally seen in lower power PC's and handheld devices.

Figure 2:
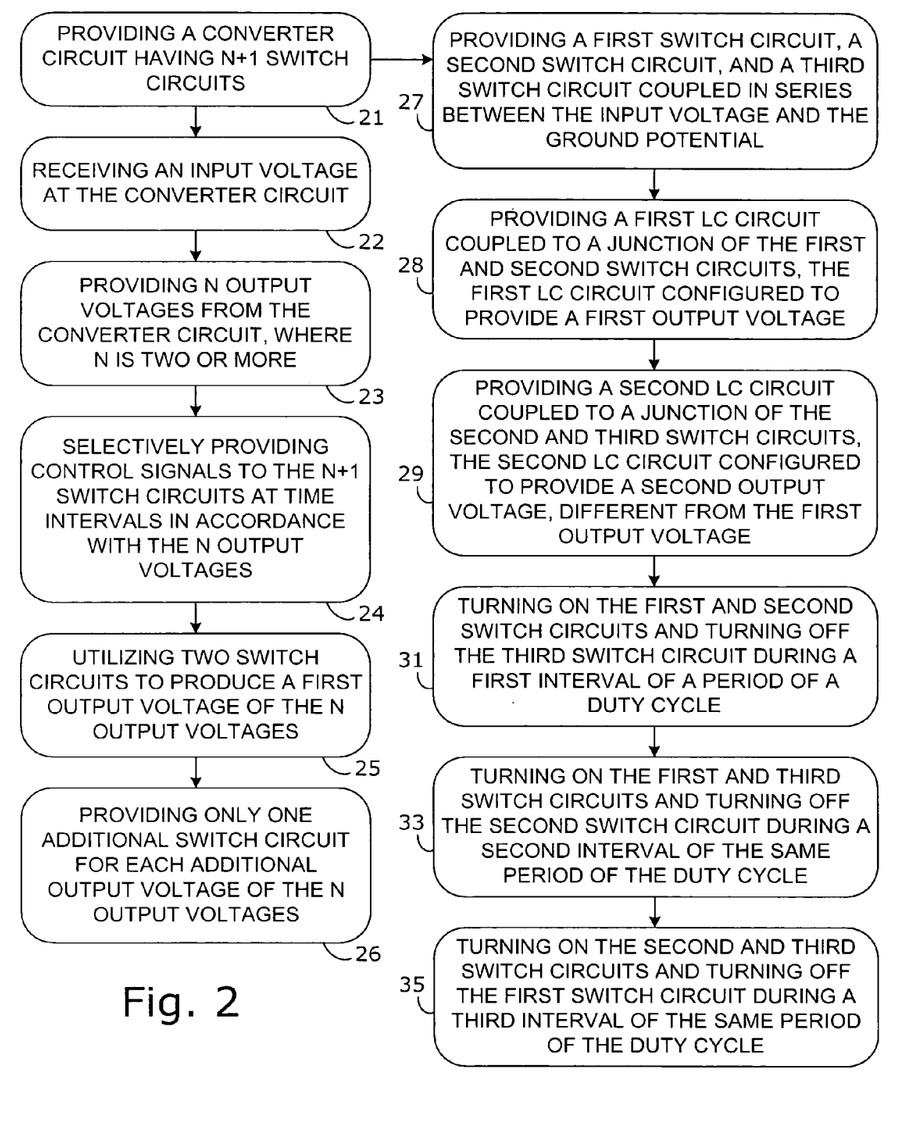
FIG. 2 is a flow diagram in accordance with some embodiments of the present invention.

With reference to FIG. 2, some embodiments of the invention may involve providing a converter circuit having N+1 switch circuits (e.g. at 21), receiving an input voltage at the converter circuit (e.g. at 22), providing N output voltages from the converter circuit, where N is two or more (e.g. at 23), and selectively providing control signals to the N+1 switch circuits at time intervals in accordance with the N output voltages (e.g. at 24). For example, some embodiments may further involve utilizing two switch circuits to produce a first output voltage of the N output voltages (e.g. at 25), and providing only one additional switch circuit for each additional output voltage of the N output voltages (e.g. at 26).

In some embodiments, providing the converter circuit may include providing a first switch circuit, a second switch circuit, and a third switch circuit coupled in series between the input voltage and the ground potential (e.g. at 27), providing a first LC circuit coupled to a junction of the first and second switch circuits, the first LC circuit configured to provide a first output voltage (e.g. at 28), and providing a second LC circuit coupled to a junction of the second and third switch circuits, the second LC circuit configured to provide a second output voltage, different from the first output voltage (e.g. at 29).

A method of operation, according to some embodiments of the invention, may include turning on the first and second switch circuits and turning off the third switch circuit during a first interval of a period of a switching cycle (e.g. at 31), turning on the first and third switch circuits and turning off the second switch circuit during a second interval of the same period of the switching cycle (e.g. at 33), and/or turning on the second and third switch circuits and turning off the first switch circuit during a third interval of the same period of the switching cycle (e.g. at 35).

Figure 3:
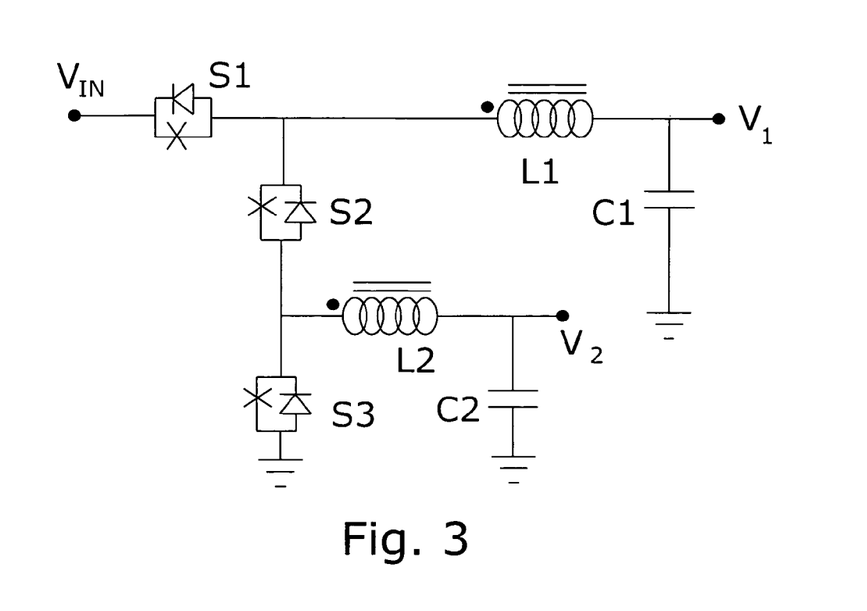
FIG. 3 is a schematic diagram in accordance with some embodiments of the present invention.

With reference to FIG. 3, an example three switch dual output buck converter, according to some embodiments of the invention, includes three switches S1, S2, and S3 to provide two voltage outputs $V_1$ and $V_2$. The three switches S1, S2, and S3 are connected in series between an input voltage $V_{IN}$ and ground. A first LC circuit is connected to the junction between S1 and S2. A second LC circuit is connected to the junction between S2 and S3. The first LC circuit provides the first output voltage $V_1$ at the junction of the inductor L1 and the capacitor C1. The second LC circuit provides the second output voltage $V_2$ at the junction of the inductor L2 and the capacitor C2. In general, $V_1$ will be greater than $V_2$. In most applications, providing two or more different output voltages is a desirable feature.

Advantageously, some embodiments of the invention may generate two distinct voltage rails using only three semiconductor switches (e.g. power FETs or MOSFETS). The switches S1, S2 and S3 may form a network that selectively applies the input potential $V_{IN}$ and the ground potential at specific time intervals to the input of the LC circuits coupled at various points of the network. For example, operation of some embodiments of the invention may utilize three separate intervals or modes of operation within a switching cycle (as opposed to the typical two modes found in a conventional buck converter). The additional mode allows the switch S2 to carry current in opposite directions in different parts of a switching cycle.

As compared to a conventional buck converter utilizing two switch elements per output voltage, some embodiments of the invention may provide the following advantages:

utilizing less switching devices to generate multiple separate voltage rails thus providing a cost reduced solution;

saving space by utilizing a relatively compact circuit to power multiple devices in reduced amount of circuit area;

increasing efficiency, for example, by pairing or ganging low and high power output rails;

increasing efficiency, for example, because an average load on the converter from both the outputs can be maintained (both outputs in general are not at high output states at the same time); and     simplifying control requirements of the converter, making it more compact and less expensive.

Of course, various embodiments of the present invention may or may not be better suited for various power applications. Some embodiments of the voltage converter of the present invention may be particularly well suited to power the many general purpose low power rails on a PC platform. For example, one or more N+1 switch, N output buck converters, according to some embodiments of the invention, may replace the many low power linear regulators seen on a computing platform.

Figure 4:
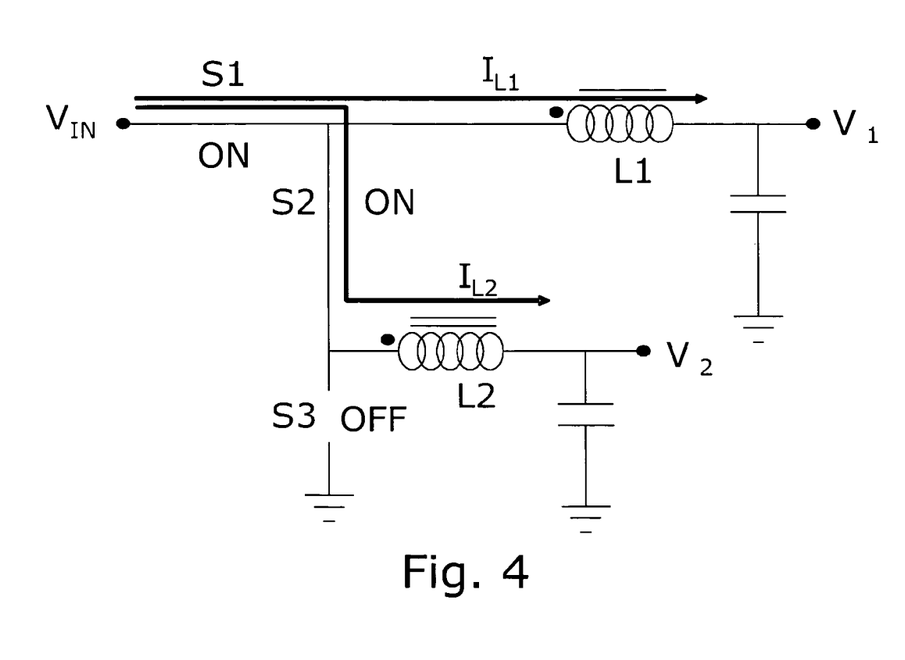
FIG. 4 is a current flow diagram in accordance with some embodiments of the present invention.

With reference to FIG. 4, in a first interval the switches S1 and S2 may be turned ON (closed) and the switch S3 may be turned OFF (open). Under these conditions, the inductor currents $I_{L1}$ and $I_{L2}$ may be ramped directly from the input voltage source $V_{IN}$.

Figure 5:
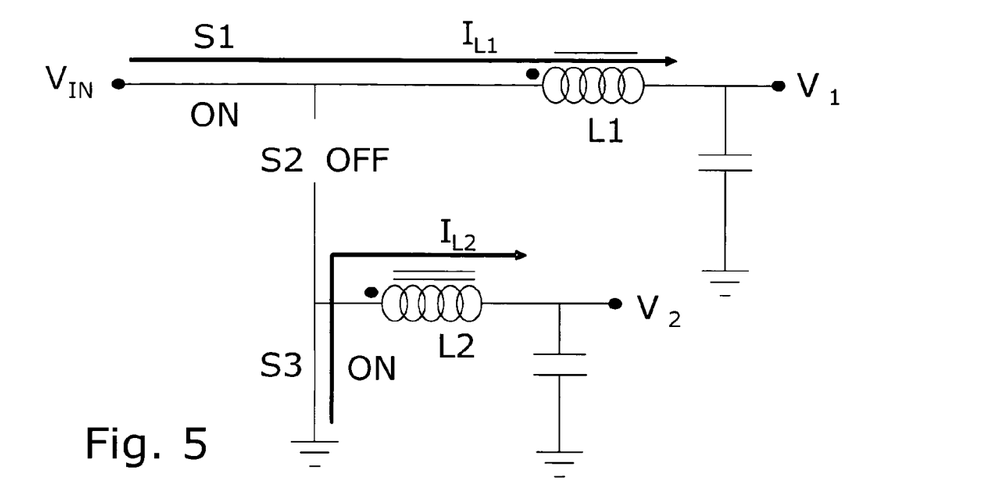
FIG. 5 is another current flow diagram in accordance with some embodiments of the present invention.

With reference to FIG. 5, at the end of the first interval, in a second interval the switch S1 may continue to be ON, the switch S2 may be turned OFF (open), and the switch S3 may be turned ON (closed). In the second interval, the current $I_{L1}$ in the inductor L1 continues to ramp up (being fed from source $V_{IN}$), but the current $I_{L2}$ in the inductor L2 starts ramping down since the voltage across the inductor L2 is reversed with the switch S3 closed. The switch S2 may be reverse biased with substantially no current flowing through the switch S2.

Figure 6:
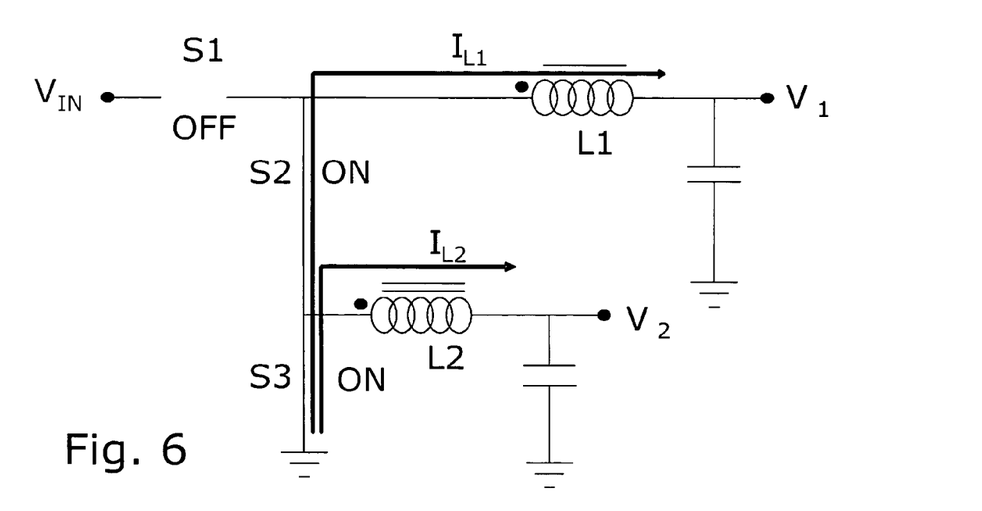
FIG. 6 is another current flow diagram in accordance with some embodiments of the present invention.

With reference to FIG. 6, after the second interval, in a third interval the switch S1 may be turned OFF (open), the switch S2 may be turned ON (closed), and the switch S3 may continue to be ON (closed). Under these conditions, the inductor currents $I_{L1}$ and $I_{L2}$ may continue to flow in the positive direction through the ground, S2, and S3 paths as shown in FIG. 6.

Figure 7:
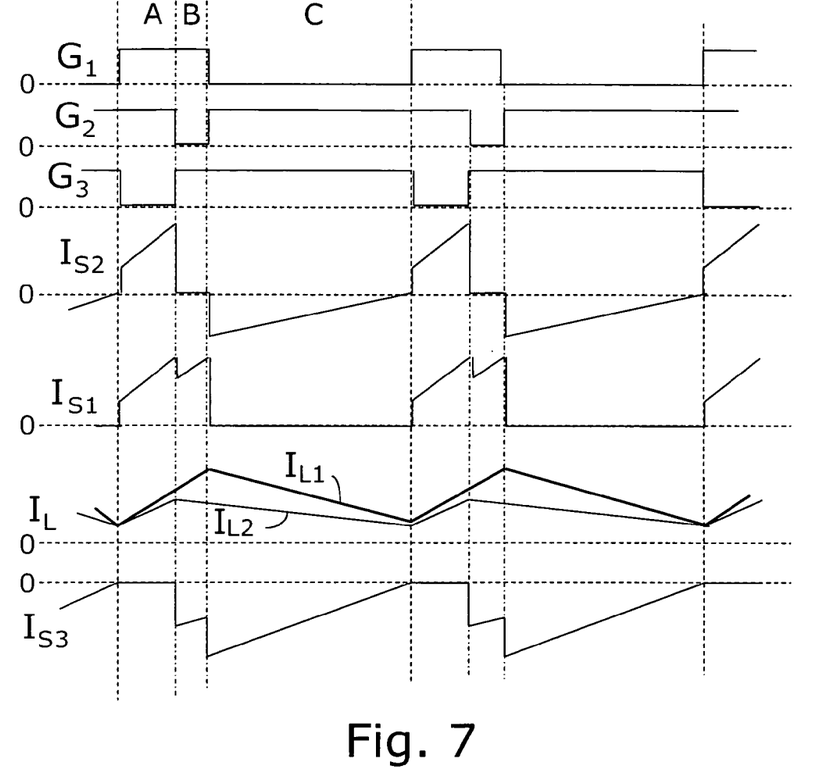
FIG. 7 is a signal chart in accordance with some embodiments of the present invention.

FIG. 7 shows an example of the typical waveforms that may be seen under the various operating intervals. The portion A of the switching cycle corresponds to the first interval, the portion B corresponds to the second interval, and the portion C corresponds to the third interval. Those skilled in the art will appreciate that appropriate control signals (e.g. gate signals) may be provided to the switch elements for proper operation of the converter circuit. On the left hand side of the chart, the signals G1, G2, and G3 represent example gating signals to be applied to the corresponding switches S1, S2 and S3, respectively. For example, the gating signals may be derived from the conventional duty cycle D1 and D2 (e.g. the ratio of ON-time of S1 to the switching period of a conventional buck converter) for $V_1$ and $V_2$, respectively. The signals $I_{S1}$ and $I_{S2}$, & $I_{S3}$ represent the current in S1, S2, and S3, respectively. The signals $I_{L1}$ and $I_{L2}$ represent the current in the inductors L1 and L2, respectively. Because S2 may be ON a significant portion of the time, it may be preferred to utilize a switch possessing low ON-state resistance for the switch S2, similar to the switch S3 and unlike the switch S1.

The three modes of operation may be further understood with reference to the signals illustrated in FIG. 7 (together with FIGS. 4-6). Initially it is assumed that $V_1$ is greater than $V_2$ and that the converter is in steady state. Accordingly, just prior to the beginning of a switching cycle, the switches S2 and S3 are ON, the switch S1 is OFF, and the inductors L1 and L2 are freewheeling energy to the two loads. The first mode of operation, interval (A), begins with the switch S3 being turned OFF and the switch S1 being turned ON. The switch S2 is already ON and conducting current. The current in the switch S1 substantially immediately rises to the level of the minimum inductor current in the inductor L1. At substantially the same instant the current in the switch S2 reverses direction since S2 is already ON. The current in the inductor L2 continues to flow in the forward direction delivering power to the load $V_2$. An equivalent circuit for the first interval (A) is shown in FIG. 4. The direction of current flow is shown by $I_{L1}$ and $I_{L2}$ in FIG. 4. During the first switching interval (A), the current ramps up in each of the inductors L1 and L2, respectively.

The second mode of operation, interval (B), begins when the switch S2 is turned OFF and the switch S3 is turned ON, substantially simultaneously. In practice a small dead time may be inserted between the change of states between S2 and S3. For example, the switch S2 may first be turned OFF before turning ON the switch S3. During the brief dead time period the anti-parallel body diode of S3 conducts. When the switch S2 turns OFF, the current in the inductor L2 is substantially instantaneously transferred to the switch S3 and the energy stored in the inductor L2 is freewheeled through the load maintaining the current in the inductor L2. Since the switch S1 is still ON, the drain of the switch S2 is at the input potential whereas the source of the switch S2 is at ground potential (since the switch S3 is ON). Thus the body diode of the switch S2 is reverse biased and hence substantially no current flows through S2. An equivalent circuit for the second interval (B) is shown in FIG. 5.

The third mode of operation, interval (C), begins when the switch S1 is turned OFF and the switch S2 is turned ON. The current though the switch S1 drops to zero when substantially simultaneously the current through the switch S2 jumps to the maximum inductor current (through L1) but in the opposite direction. The current in the switch S2 initially flows through the body diode and would continue to do so even if the switch S2 is not turned ON. However, in some embodiments it may be preferred to reduce losses in the switch S2 by using a lower resistance path through the channel of the switch S2 rather than the body diode. The third interval (C) comes to an end when the switch S3 is turned OFF and the switch S1 starts conducting at the end of the switching cycle. An equivalent circuit for the third interval (C) is shown in FIG. 6.

Figure 8:
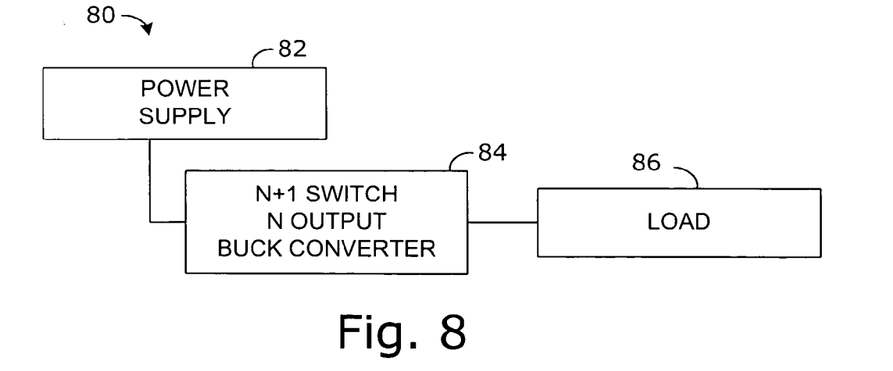
FIG. 8 is a block diagram of a system in accordance with some embodiments of the present invention.

With reference to FIG. 8, an electronic system 80 includes a power supply 82 providing power to an N+1 switch N output buck converter 84 (e.g. a three switch dual output buck converter), where N is two or more. For example, the power supply may include an AC/DC adapter or a battery configured to provide the input voltage to the converter 84. The output of the converter 84 may be provided to a load 86, which may utilize two output voltages from the converter 84. For example, the load may include one or more integrated circuits (e.g. a processor and a memory).

The converter 84 may have one or more of the features described above in connection with FIGS. 1-9. For example, the converter 84 may include a converter circuit having N+1 switch circuits, the converter circuit being configured to receive an input voltage and to provide N output voltages, where N is two or more, and a control circuit to selectively provide control signals to the N+1 switch circuits at time intervals in accordance with the N output voltages, wherein one of the N output voltages is provided to the integrated circuit.

In some embodiments of the system 80, two switch circuits may be utilized to produce a first output voltage of the N output voltages and only one additional switch circuit may be provided for each additional output voltage of the N output voltages. For example, for a three switch dual output converter, the converter circuit may include a first switch circuit, a second switch circuit, and a third switch circuit coupled in series between the input voltage and the ground potential. The converter circuit may further include a first LC circuit coupled to a junction of the first and second switch circuits and a second LC circuit coupled to a junction of the second and third switch circuits. The first LC circuit may be configured to provide a first output voltage and the second LC circuit may be configured to provide a second output voltage, different from the first output voltage.

In some embodiments of the system 80, the control circuit may be configured to turn on the first and second switch circuits and turn off the third switch circuit during a first interval of a period of a switching cycle. The control circuit may be further configured to turn on the first and third switch circuits and turn off the second switch circuit during a second interval of the same period of the switching cycle. The control circuit may be further configured to turn on the second and third switch circuits and turn off the first switch circuit during a third interval of the same period of the switching cycle.

Figure 9:
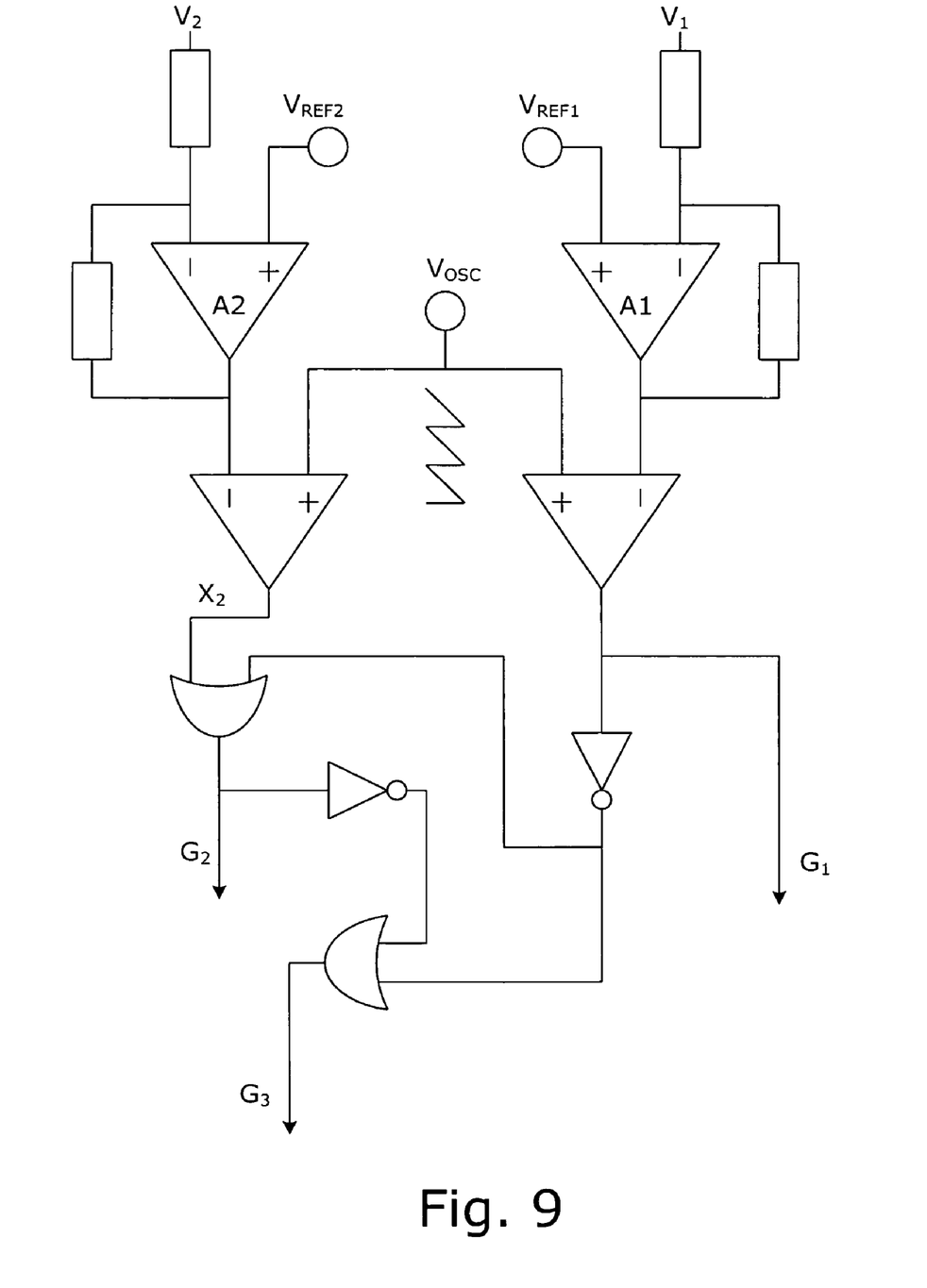
FIG. 9 is another schematic diagram in accordance with some embodiments of the present invention.

Those skilled in the art will appreciate that many different hardware and/or software arrangements may be configured to provide appropriate control signals to the switching elements. For example, a processor or a micro-controller may readily be programmed to output waveforms with appropriate timing relationships. Alternatively, a discrete hardware circuit may be configured with various time constants to provide the control signals with appropriate timing relationships. With reference to FIG. 9, one example of a control circuit 90, in accordance with some embodiments of the invention, includes comparators and logic gates configured to provide the gating signals. The output voltages $V_1$ and $V_2$ may be maintained within certain range of regulation limits specified by applying negative feedback control principles. The output voltages $V_1$ and $V_2$ are compared with reference voltages $V_{REF1}$ and $V_{REF2}$ respectively. The error amplifiers A1 and A2 generate the appropriate compensating signals that are then compared with the oscillator voltage $V_{OSC}$. The comparator outputs result in the gating signal $G_1$ and an intermediate signal $X_2$. Additional logic circuitry (e.g. a combination of inverters and logic OR gates) may appropriately generate the other gating signals $G_2$ and $G_3$ for switching elements S2 and S3, respectively.

Figure 10:
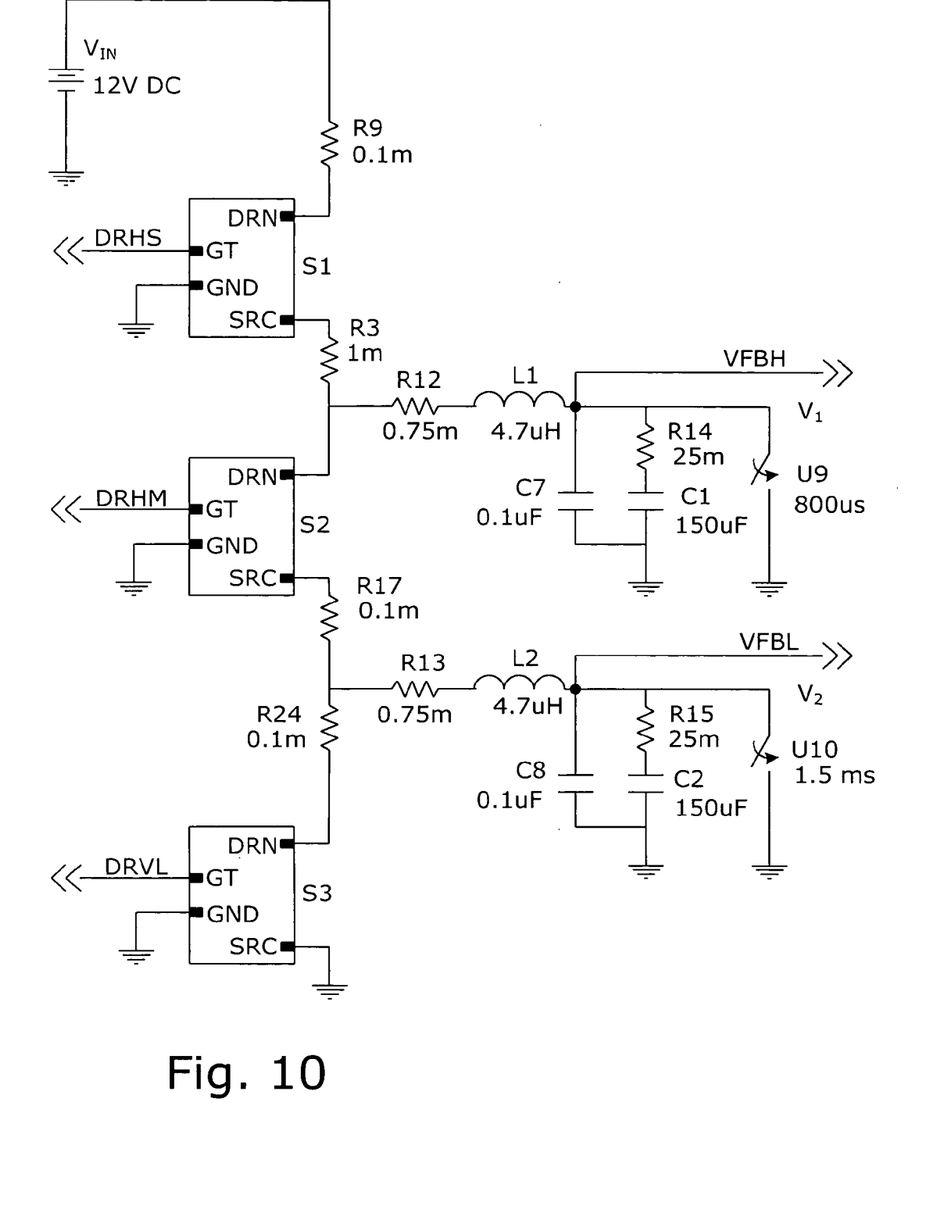
FIG. 10 is another schematic diagram in accordance with some embodiments of the present invention.

With reference to FIG. 10, an example simulation circuit provided results showing the steady state operation and verifying the expected modes of operation of the converter. The simulated waveforms showed the regulated output voltages for the two distinct outputs.

The converter operation as explained above was verified by simulating the converter circuit shown in FIG. 10 (with representative component values) using the PSpice simulation tool. Design requirements which may be applicable to a mobile application were used in this example. The converter input-output requirements chosen for the verification are listed below:

$V_{IN}$=12V;
$V_1$=5V;
$I_{L1}$=5 Amps (full load);

$V_2$=3.3V;
$I_{L2}$=5 Amps (full load); and
Switching Frequency (Fs)=200 KHz.

The full load currents for each output were chosen to be same to illustrate the steady state operation, as an example. In some applications, it may be desirable to implement the converter with different load requirements for better efficiency.

The switches S1, S2, and S3 were modeled as voltage controlled resistors to emulate the behavior of the semiconductor FETs. The converter is controlled by a typical voltage mode feedback control (not shown in the diagram). For the purpose of verifying the steady state operation, the control characteristics and compensation parameters of the feedback control were not optimized. However the control loop was adjusted so that the converter was stable.

Figure 11:
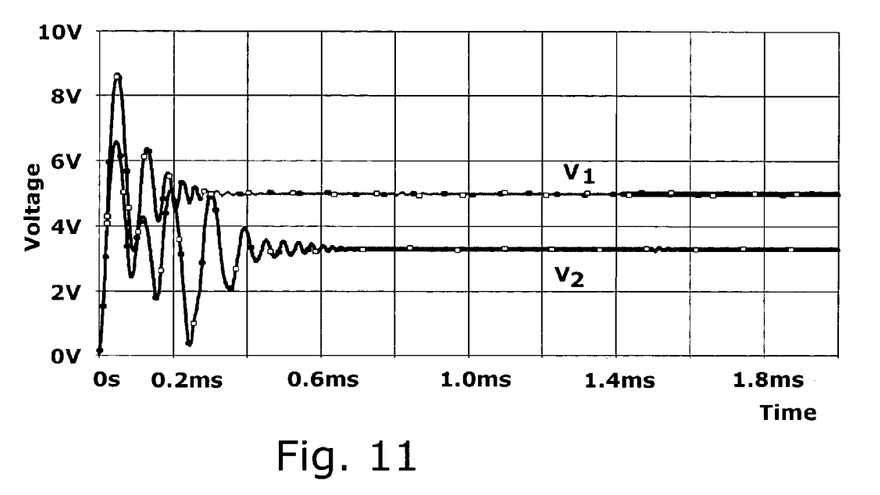
FIG. 11 is a graph of simulation results.
Figure 12:
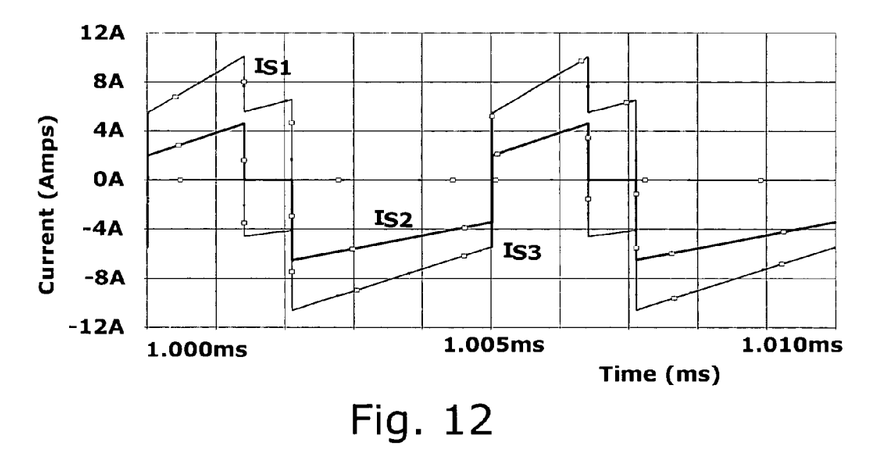
FIG. 12 is another graph of simulation results.

With reference to FIG. 11, results from the simulation confirmed that both voltages reach their respective regulation limits of 5V and 3.3V. The simulated converter operated in a stable manner such that the initial transient disturbances settled down to substantially zero. The current profiles under steady state conditions in each of the devices are shown in FIG. 12. It can be seen that they are in substantial agreement with the current profiles in FIG. 7. The current profile of switch S2 shows that the current flowing through it is bidirectional, confirming the fact that it delivers current to output $V_2$ in the forward direction and to output $V_1$ in the opposite direction.

Without limiting the invention to theory of operation, some practical considerations may be taken into account. For the two output case, the power for each output is being handled by two switches as opposed to by one switching element in a conventional solution. Thus care may be taken to see that excessive losses do not occur resulting in reduced efficiency of the converter. The converter may operate better with reduced losses when the output requirements of each of the loads are different from each other. The following considerations may be important for an efficient and improved converter circuit.

Because the switch S2 is ON (closed) for a major portion of the switching cycle, in some applications a FET with a low RDS_ON may be chosen to keep conduction losses low. The switch S2 may be similar to the switch S3 in characteristics.

Because $V_2$ is generally lower than $V_1$, in some applications the duration for which S2 is ON may be determined by the changes in the load and line conditions of $V_2$. There is a possibility that under transient conditions switch S2 may be ON for an entire switching period. Accordingly, care may be taken to ensure that the gating signals are such that the supply voltage is not shorted to ground during any instant in a switching cycle.

In some applications, assuming that the output voltages are fairly low compared to the input voltage, the duty cycle of S1 may be low (in the range of 20% or below). Thus the higher RMS current capability imposed by the addition of the output voltage $V_2$ may be small compared to a conventional solution. In addition, it may be noted that both the outputs do not demand full load power all the time.

In some applications, it may be beneficial from an efficiency perspective to have $V_2$ with a higher full load current demand paired with $V_1$ which has a low full load current requirement. For example, the converter design may have better efficiency if $V_1$ requirements are 1.5V @ 1A and $V_2$ requirements are 1.25V @ 10A. This is due to the fact that less burden is placed on S2 which handles power in both portions of the switching cycles. The incremental burden on S1 and S2 can easily be handled during normal operation. Advantageously, the typical PC platform may be conducive for such pairings since there are various voltages that draw a few hundreds of milliamps (e.g. implemented as linear regulators with very low efficiencies) as opposed to some subsystems which need a few amps. Such outputs can be paired or ganged and a low cost converter, according to various embodiments of the present invention, can be used for efficiency or cost improvements where feasible.

In some applications, the average load on each output of the voltage converter is seldom at high load all the time. The combined converter topology may provide a better loading scenario where the converter is operating at its peak efficiency range.

In some applications, the control circuit for the converter may utilize N feedback loops (e.g. one loop for each output voltage) and may utilize N conventional control implementations. For example, a suitable control circuit may combine all of the required feedback and control on a single control IC. However, because each output may be controlled independently, the effect of one loop with respect to the other(s) may be taken into account. For example, in some applications the effect of transient load changes on either output may be an important consideration for an optimal design.

Figure 13:
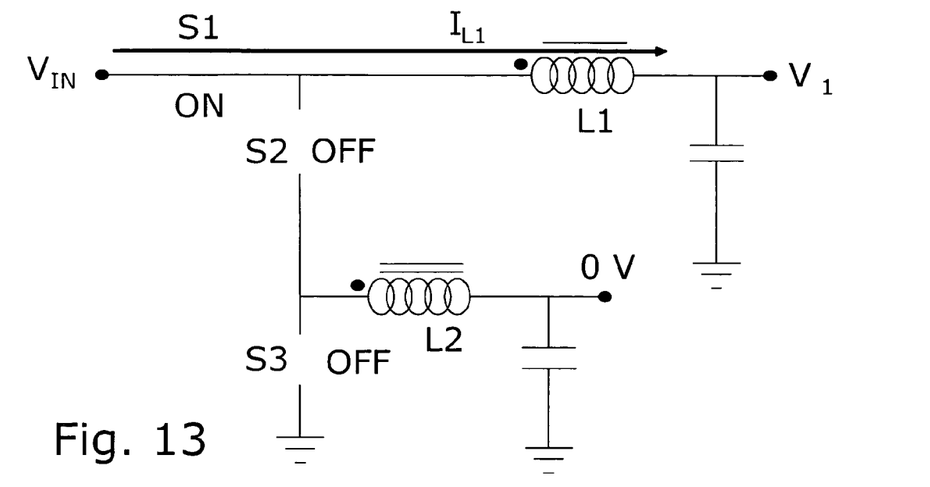
FIG. 13 is another current flow diagram in accordance with some embodiments of the present invention.
Figure 14:
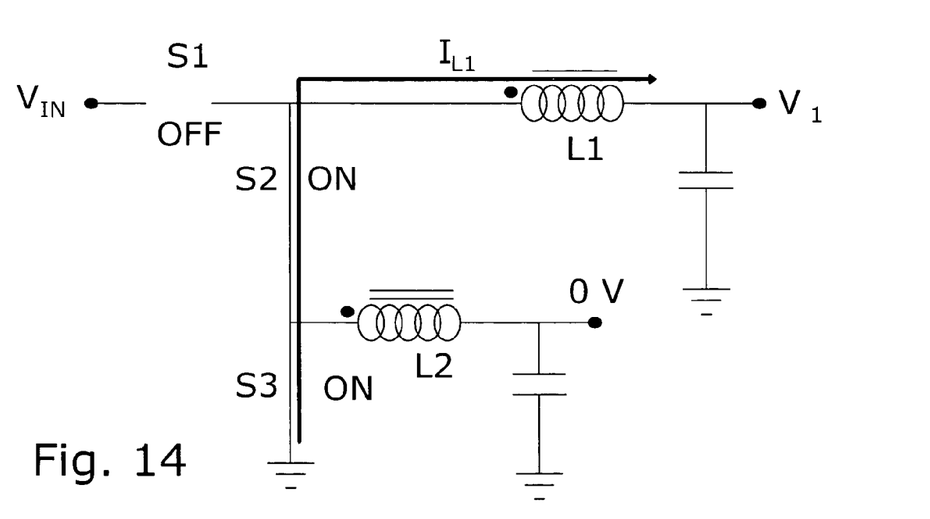
FIG. 14 is another current flow diagram in accordance with some embodiments of the present invention.
Figure 15:
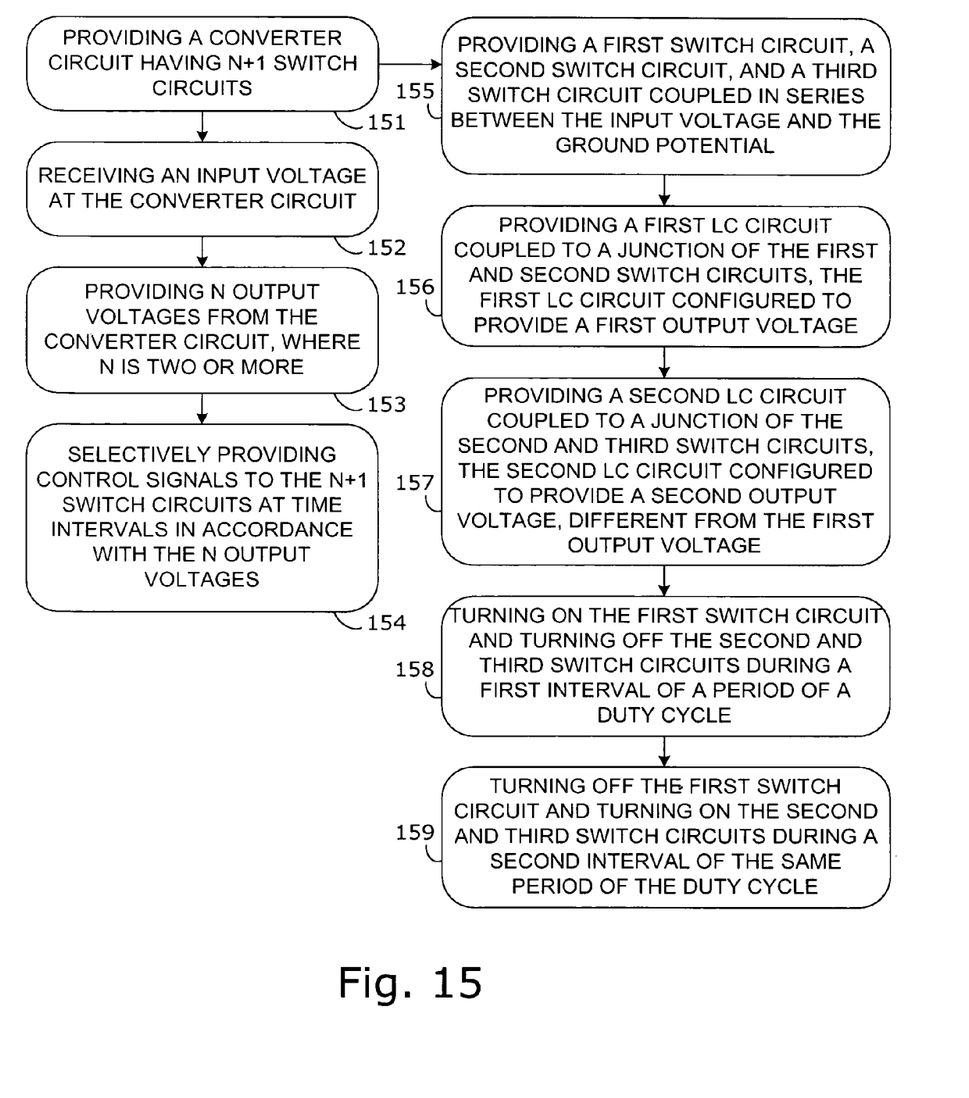
FIG. 15 is a flow diagram in accordance with some embodiments of the present invention.

With reference to FIGS. 13-15, in some applications a load or circuit connected to the output voltage $V_2$ may be turned off from time to time (e.g. in a power saving mode). In accordance with some embodiments of the invention, by selectively providing control signals to the switches S2 and S3, the converter circuit can functions as a single output voltage converter (e.g. with $V_2$ substantially equal to zero volts). For example, the switches S2 and S3 may be controlled such that they are both turned ON and OFF simultaneously such that they functions as a single cascaded switch. For buck converter operation, the switches S2 and S3 may be operated complementary to the switch S1. This operation results in the single output voltage $V_1$ continued availability while the output voltage $V_2$ will be reduced to zero. Advantageously, a simple re-adjustment of the control signals may provide this additional functionality without using additional hardware.

With reference to FIG. 13, for an example power saving mode, in a first interval the switch S1 may be turned ON (closed) and the switches S2 and S3 may be turned OFF (open). Under these conditions, the inductor currents $I_{L1}$ may be ramped directly from the input voltage source $V_{IN}$.

With reference to FIG. 14, for the example power saving mode, at the end of the first interval, in a second interval the switch S1 may be turned OFF (open) and the switches S2 and S3 may be turned ON (closed). In the second interval, the current $I_{L1}$ in the inductor L1 ramps down.

With reference to FIG. 15, some embodiments of the invention may involve providing a converter circuit having N+1 switch circuits (e.g. at 151), receiving an input voltage at the converter circuit (e.g. at 152), providing N output voltages from the converter circuit, where N is two or more (e.g. at 153), and selectively providing control signals to the N+1 switch circuits at time intervals in accordance with the N output voltages (e.g. at 154).

In some embodiments, providing the converter circuit may include providing a first switch circuit, a second switch circuit, and a third switch circuit coupled in series between the input voltage and the ground potential (e.g. at 155), providing a first LC circuit coupled to a junction of the first and second switch circuits, the first LC circuit configured to provide a first output voltage (e.g. at 156), and providing a second LC circuit coupled to a junction of the second and third switch circuits, the second LC circuit configured to provide a second output voltage, different from the first output voltage (e.g. at 157).

A method of operation, according to some embodiments of the invention, may include turning on the first switch circuit and turning off the second and third switch circuits during a first interval of a period of a switching cycle (e.g. at 158), and turning off the first switch circuit and turning on the second and third switch circuits during a second interval of the same period of the switching cycle (e.g. at 159).

The foregoing and other aspects of the invention are achieved individually and in combination. The invention should not be construed as requiring two or more of such aspects unless expressly required by a particular claim. Moreover, while the invention has been described in connection with what is presently considered to be the preferred examples, it is to be understood that the invention is not limited to the disclosed examples, but on the contrary, is intended to cover various modifications and equivalent arrangements included within the spirit and the scope of the invention.

What is claimed is:

1. An apparatus, comprising:
   a converter circuit having N+1 switch circuits, the converter circuit being configured to receive an input voltage and to provide N output voltages, where N is two or more; and
   a control circuit to selectively provide control signals to the N+1 switch circuits at time intervals in accordance with the N output voltages, wherein the converter circuit comprises:
   a first switch circuit, a second switch circuit, and a third switch circuit coupled in series between the input voltage and ground potential;
   a first LC circuit coupled to a junction of the first and second switch circuits, the first LC circuit configured to provide a first output voltage; and
   a second LC circuit coupled to a junction of the second and third switch circuits, the second LC circuit configured to provide a second output voltage, different from the first output voltage, and
   wherein in a power save mode, the control circuit switches the second switch and the third switch simultaneously to function as a single cascaded switch.

2. The apparatus of claim 1, wherein two switch circuits are utilized to produce a first output voltage of the N output voltages and wherein only one additional switch circuit is provided for each additional output voltage of the N output voltages.

3. The apparatus of claim 1, wherein the control circuit is configured to turn on the first and second switch circuits and turn off the third switch circuit during a first interval of a period of a switching cycle.

4. The apparatus of claim 3, wherein the control circuit is configured to turn on the first and third switch circuits and turn off the second switch circuit during a second interval of the same period of the switching cycle.

5. The apparatus of claim 4, wherein the control circuit is configured to turn on the second and third switch circuits and turn off the first switch circuit during a third interval of the same period of the switching cycle.

6. The apparatus of claim 1, wherein the control circuit is configured to turn on the first switch circuit and turn off the second and third switch circuits during a first interval of a period of a switching cycle.

7. The apparatus of claim 6, wherein the control circuit is configured to turn off the first switch circuit and turn on the second and third switch circuits during a second interval of the same period of the switching cycle.

8. A method, comprising:
   providing a converter circuit having N+1 switch circuits;
   receiving an input voltage at the converter circuit;
   providing N output voltages from the converter circuit, where N is two or more; and selectively providing control signals to the N+1 switch circuits at time intervals in accordance with the N output voltages, wherein providing the converter circuit comprises:
   providing a first switch circuit, a second switch circuit, and a third switch circuit coupled in series between the input voltage and, ground potential;
   providing a first LC circuit coupled to a junction of the first and second switch circuits, the first LC circuit configured to provide a first output voltage; and
   providing a second LC circuit coupled to a junction of the second and third switch circuits, the second LC circuit configured to provide a second output voltage, different from the first output voltage, and
   wherein in a power save mode, switching the second switch and the third switch simultaneously to function as a single cascaded switch.

9. The method of claim 8, further comprising:
   utilizing two switch circuits to produce a first output voltage of the N output voltages; and providing only one additional switch circuit for each additional output voltage of the N output voltages.

10. The method of claim 8, further comprising: turning on the first and second switch circuits and turning off the third switch circuit during a first interval of a period of a switching cycle.

11. The method of claim 10, further comprising:
    turning on the first and third switch circuits and turning off the second switch circuit during a second interval of the same period of the switching cycle.

12. The method of claim 11, further comprising:
    turning on the second and third switch circuits and turning off the first switch circuit during a third interval of the same period of the switching cycle.

13. The method of claim 8, further comprising:
    turning on the first switch circuit and turning off the second and third switch circuits during a first interval of a period of a switching cycle.

14. The method of claim 13, further comprising:
    turning off the first switch circuit and turning on the second and third switch circuits during a second interval of the same period of the switching cycle.

15. A system, comprising:
    an integrated circuit;
    a converter circuit having N+1 switch circuits, the converter circuit being configured to receive an input voltage and to provide N output voltages, where N is two or more; and
    a control circuit to selectively provide control signals to the N+1 switch circuits at time intervals in accordance with the N output voltages,
    wherein one of the N output voltages is provided to the integrated circuit, wherein the converter circuit comprises:
    a first switch circuit, a second switch circuit, and a third switch circuit coupled in series between the input voltage and ground potential;
    a first LC circuit coupled to a junction of the first and second switch circuits, the first LC circuit configured to provide a first output voltage; and a second LC circuit coupled to a junction of the second and third switch circuits, the second LC circuit configured to provide a second output voltage, different from the first output voltage, and wherein in a power save mode, switching the second switch and the third switch simultaneously to function as a single cascaded switch.

16. The system of claim 15, wherein two switch circuits are utilized to produce a first output voltage of the N output voltages and wherein only one additional switch circuit is provided for each additional output voltage of the N output voltages.

17. The system of claim 15, wherein the control circuit is configured to turn on the first and second switch circuits and turn off the third switch circuit during a first interval of a period of a switching cycle.

18. The system of claim 17, wherein the control circuit is configured to turn on the first and third switch circuits and turn off the second switch circuit during a second interval of the same period of the switching cycle.

19. The system of claim 18, wherein the control circuit is configured to turn on the second and third switch circuits and turn off the first switch circuit during a third interval of the same period of the switching cycle.

20. The system of claim 15, wherein the control circuit is configured to turn on the first switch circuit and turn off the second and third switch circuits during a first interval of a period of a switching cycle.

21. The system of claim 20, wherein the control circuit is configured to turn off the first switch circuit and turn on the second and third switch circuits during a second interval of the same period of the switching cycle.

22. The system of claim 15, wherein the integrated circuit comprises a processor.

23. The system of claim 15, further comprising:

a battery configured to provide the input voltage to the converter circuit.

* * * * *